A. CRAFTS.
Cooking Stove.
No. 5,125. Patented May 22, 1847.
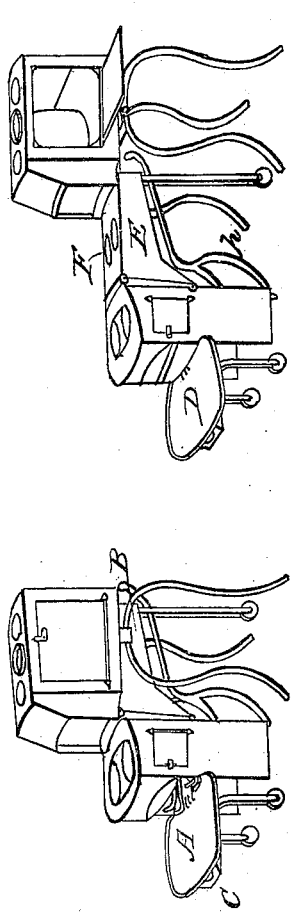
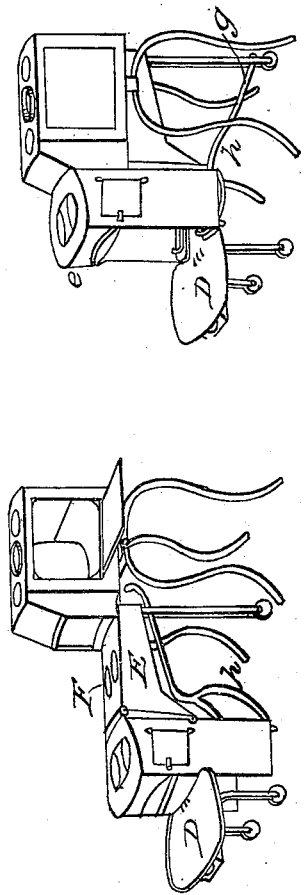
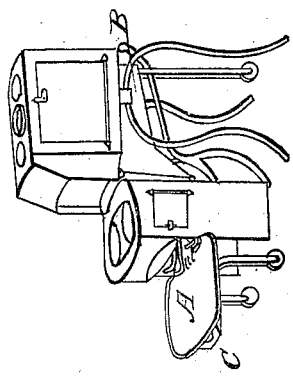
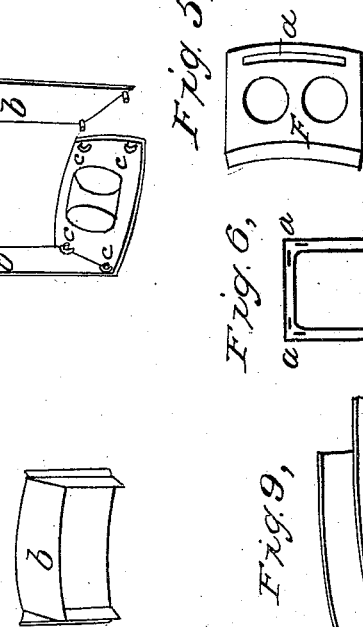

UNITED STATES PATENT OFFICE.

ASHLEY CRAFTS, OF AUBURN, OHIO.

COOKING-STOVE.

Specification of Letters Patent No. 5,125, dated May 22, 1847.

*To all whom it may concern:*

Be it known that I, ASHLEY CRAFTS, of Auburn, in the county of Geauga and State of Ohio, have invented a new and Improved Mode of Constructing Cooking-Stoves; and I do hereby declare that the following is a full and exact description of the same, reference being had to the annexed drawings, making a part of this specification.

The nature of my invention consists in constructing a stove which can be used as a small cooking stove, as represented by Fig. 1. If a larger one is desired, the stove part may be drawn out, from under the oven as represented in Fig. 2, which gives two additional boiler holes. If a fire place or open stove is desired, it may be put into the form represented by Fig. 3, which is effected by running the stove part under the oven, and raising the jambs to their elevated position.

To enable others skilled in the art, to make and use my invention, I will proceed to describe its construction and operation.

The hearth plate A, Figs. 1 and 4, extends to the back of fire box, and attaches to the flue plate B Figs. 1 and 4. The hearth is not sunken as is usually the case in the bottom plate of stoves, but a sliding box C is attached to the under side of the hearth for the purpose of receiving the ashes as they fall through the grates D. The sides of the flue E, extend from the front of the fire box, to the back end of the oven bottom, when the stove is in the position represented by Fig. 1, in which case the principal part of the flue is directly under the bottom of the oven. The plate F, Figs. 2 and 5, which forms the top of the flue, is furnished with boiler holes, having flat covers, so as not to interfere with the oven bottom when the stove passes under the oven. The back end of this plate is provided with an aperture G, Fig. 4, through which the fire and smoke passes into the flue extending around the oven. The plates E′ a part of the plate E prevent the escape of ashes when the jambs are raised.

There are two legs attached to the stove hearth and one to bottom flue plate, all furnished with rollers upon which the stove moves in changing it from one position to another, the oven part always standing stationary. The rollers in the bottom of the legs pass over or upon rails fastened to the floor.

The oven may be formed of cast metal or sheet iron, in any convenient form. I prefer the form represented by Fig. 9, which shows the bottom half of the oven; the upper half being an exact counterpart, and these parts are put together, the ends resting in brackets on the inside of the end plates of oven box Fig. 6, letters *a, a, a, a*. There are two apertures, *a, b*, Fig. 7 in the bottom plate of the oven box, and when the stove is used in the position represented by Fig. 1, the aperture G, Fig. 4, comes in connection with the aperture *b* Fig. 7, in the bottom of the oven box. When the stove is drawn out as represented by Fig. 2, the aperture G Fig. 4 is in connection with the aperture *a*, in plate Fig. 7. There is a slide damper Fig. 8 which closes or opens the apertures, *a, b*, as the case may require. The flame and smoke after passing through the aperture G, passes around the oven in either direction, being regulated by a damper at the top of inside oven plate, so as to make it pass in either direction and escape into the stove pipe in the center of the top plate of oven box.

The front top, Fig. 3, letter *a*, and Fig. 10 (which is inverted for the purpose of showing the under side) has two loops cast on the under side at each end *a, a*, Fig. 10. The side jambs are represented by *b, b*, Fig. 10, and have 2 pins on each, cast on the inside at the top end, which pins lock into the loops on the front top, as shown at *c, c*, Fig. 10, after the pins are inserted in the loops, the plates or jambs being inclined inward, then by spreading the bottom of jambs, the front plate Fig. 15, and *e* Fig. 3, is slid into its proper place, and fastened between two flanges with a key or wedge, which holds all fast. This last described portion of the stove is that part which is raised up when the stove stands as represented by Fig. 3, meeting the flue in front oven plate at *a* Fig. 3, which plate is also represented by Fig. 11 with the opening or aperture at *b*. This aperture is closed by a damper represented by Fig. 14, when it is not used for fire place.

Fig. 12 represents the lever which is used to raise the top of fire box, to its elevated position. This lever is shown in its proper place and position at *h h* Figs. 2 and 3, and by its operation, the change from a cooking stove to a fire place is effected. The lever is made of cast iron with a hook cast on the top, by which it is attached to a loop cast on the back side of middle flue plate as shown at *h*, Fig. 4. The arm of this lever passes back through a slot in the back leg of the stove as represented by Fig. 3 letter *g*.

What I claim as my invention and desire to secure by Letters Patent is—

1. Making the stove sides E' continuous with the hearth and flue plates, both top and bottom in combination with the sliding jambs; which keeps all fire or ashes from dropping through when the jambs slide up or down outside of them.

2. The method by which the jambs and front top and other plates of the stove are fastened together, which is by four loops *a*, *a*, Fig. 10, two of which are cast on each end of the top, and the two pins which are cast on to each jamb, all on the inner and under side of each piece. The pins lock into the loops and make all fast without the use of bolts or rods.

3. The manner of using the lever in combination with the movable jambs, by which the stove is changed from a cook stove to a fire place.

4. Arrangement in the front oven plate of an aperture or chimney flue *b*, Fig. 11, which flue constitutes the draft when it is used as a fire place.

5. The moving the stove back to bring the back side of the front top to meet the chimney flue in the front oven plate at *a*, Fig. 3, when raised into a fire place.

ASHLEY CRAFTS.

Witnesses:
THOMAS WALL,
JEHU BRAINERD.